J. Stevens,
Cage Trap,
No 7,431.  Patented June 11, 1850.
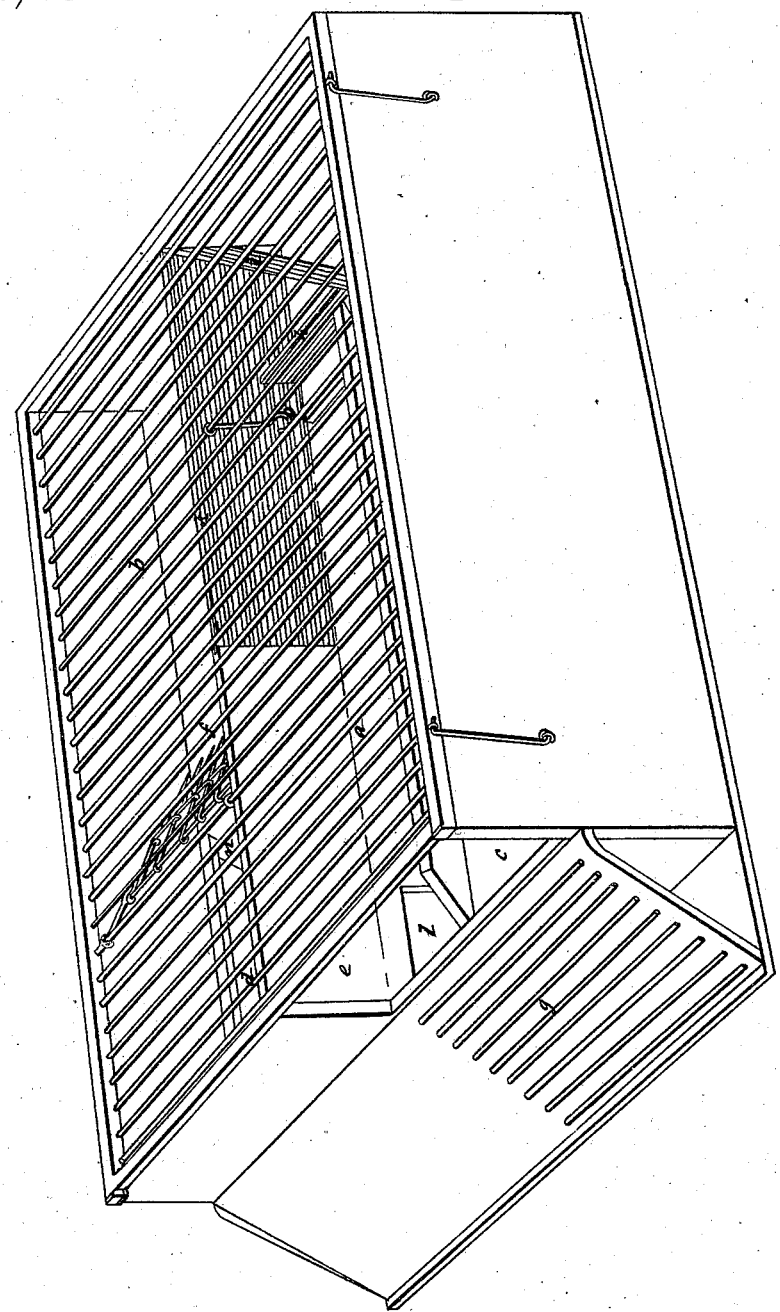

UNITED STATES PATENT OFFICE.

JAMES STEVENS, OF MIDDLETOWN, MARYLAND.

ARRANGEMENT OF MIRRORS IN TRAPS.

Specification of Letters Patent No. 7,431, dated June 11, 1850.

*To all whom it may concern:*

Be it known that I, JAMES STEVENS, of Middletown, in the county of Frederick and State of Maryland, have invented certain new and useful Improvements in Animal-Traps; and I do hereby declare that the following is a full, clear, and exact description of my decoy trap, reference being had to the accompanying drawing, which forms part of this specification.

My invention consists in a trap constructed in such manner that the rat who looks at the bait shall see his own image reflected by a mirror in such a position as will lead him to believe that a second rat is endeavoring to get before him in seizing the bait; and when the first rat has been caught his image will also be reflected by a mirror so that the next rat who shall look at the bait shall see two rats apparently striving to seize it, thus decoying him upon the turning floor which yields to his weight and precipitates him into the body of the trap.

The trap in the drawing consists of a rectangular box closed at the top by wire to admit light, and divided into four equal compartments $a$, $b$, $c$, $d$ by a vertical $e$ and a horizontal partition $f$ crossing each other at right angles. The front end of one of the upper compartments, $a$, is open, and an inclined board, $g$, is secured to the front of the trap, to enable rats to enter with greater ease; the bottom of this compartment is constructed to turn freely on an axis but its weight is so distributed that if undisturbed it preserves a horizontal position. At the hinder extremity of this compartment two mirrors $h$, $i$, are secured, the one $h$ crossing the end of the compartment reflects directly the image of an animal entering the open end; the other mirror $i$ is inclined to the sides of the compartments and reflects the image of any object contained in the adjoining compartment $b$ which at this point is separated from that containing the mirrors by a pane of glass $k$. The compartment immediately beneath the turning floor communicates with the adjoining lower one by an opening $l$ in the partition, and the compartment $d$ communicates with the one above it by an inclined board $n$ having a gate hanging at its upper end. The space beneath the one half of the turning floor is closed to prevent a rat in the trap from escaping when the floor turns into the position in which it is represented in the drawing.

The trap is set by fastening the bait to the hook $o$. If then a rat looks at the bait he will see his own image reflected directly by the mirror $h$ and imagining that a second rat is endeavoring to seize the bait before him, will greedily run toward it, as he approaches the bait his weight will cause the inner side of the turning floor to preponderate and to turn into the position in which it is represented in the drawing, thus precipitating the rat into the compartment beneath. From this, in his endeavors to escape, he will make his way into the compartment $b$, from which his image will be reflected by the mirror $i$ to any other rat who may be attracted either by the cries of the one in the trap or by the bait; the second rat in entering the compartment $a$ will now see not only his own image but also that of the first one caught, and will therefore be more easily decoyed into entering.

A self setting door may be placed at the entrance of the trap, which will shut down behind the rat, spank him in, and be reset by the turning of the floor. This door will be of service to prevent the withdrawal of a timid rat disposed to retreat from his apparent antagonist reflected in the mirror.

Having thus described my improved trap, what I claim therein as new and desire to secure by Letters Patent, is—

The arrangement of the mirrors substantially in the manner and for the purpose set forth.

In testimony whereof I have hereunto subscribed my name.

JAMES STEVENS.

Witnesses:
W. T. C. MILLER,
JOHN A. DEAN.